(No Model.)

R. F. SCHIMPER & C. F. W. SIEDHOF.
COVER FOR CULINARY VESSELS.

No. 310,468. Patented Jan. 6, 1885.

WITNESSES
Franck L. Ourand
E. M. Johnson

Rudolf F. Schimper
Charles F. W. Siedhof
INVENTOR

Attorney

UNITED STATES PATENT OFFICE.

RUDOLF F. SCHIMPER AND CHARLES F. W. SIEDHOF, OF UNION HILL, N. J.

COVER FOR CULINARY VESSELS.

SPECIFICATION forming part of Letters Patent No. 310,468, dated January 6, 1885.

Application filed August 13, 1884. (No model.)

*To all whom it may concern:*

Be it known that we, RUDOLF F. SCHIMPER and CHARLES F. W. SIEDHOF, citizens of the United States of America, residing at Union Hill, in the county of Hudson and State of New Jersey, have invented certain new and useful Improvements in Covers for Culinary Vessels; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain new and useful improvements in attachments for culinary vessels; and it consists more especially in providing a cover for a vessel of this class which is adapted to fit within the vessel, so as to prevent liquids from boiling over, and also to provide a space in the upper part of the vessel, upon which articles may be placed when it is desired to cook the same by the action of the steam which is generated from the liquid in the lower portion of the cooking utensil.

Figure 1:
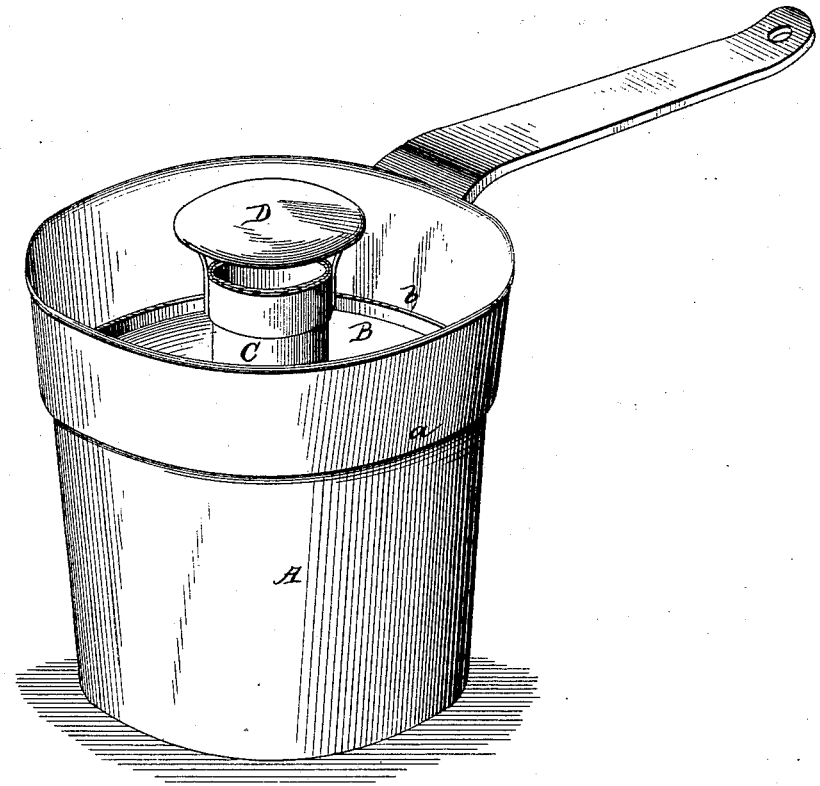
Figure 2:
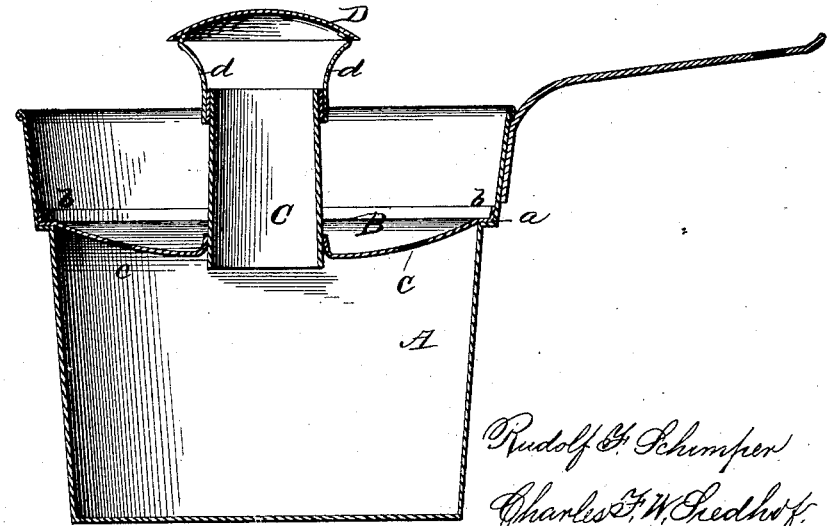

In the accompanying drawings, which illustrate our invention, Figure 1 is a perspective view, and Fig. 2 is a sectional elevation.

A is the body of a cooking-vessel, the upper portion of which is provided with an offset, $a$, upon which the supplemental cover B will rest. A supplemental cover, B, consists of a concave disk the rim of which is upturned, as shown at $b$. To the central portion of this concave disk B is secured, by means of solder or otherwise, a slightly-tapered tube, C, the lower portion of which extends slightly below the disk B. The disk B is provided circumferentially adjacent to the opening in which the tube C is secured with perforations $c$, the area of which when combined is about equal to the area of the lower portion of the tube C. The upper portion of the tube C is provided with a removable screen, D, which is supported thereon by the uprights $d\ d$.

The device hereinbefore described is adapted to be used either with or without the usual cover, and when such a cover is employed it will fit over the top of the vessel and attachment.

The operation of our invention is as follows: When it is desired to boil or cook liquids, they are placed in the vessel A and the attachment placed therein, which attachment will prevent the overflow or boiling over of the contents of the vessel. The air-bubbles being broken by contact with the lower portion of the disk B, or when there is a violent boiling the liquid and air-bubbles pass upwardly through the tube C, and are deflected by the concave cover D upon the disk, and the liquid being condensed passes into the receptacle A through the perforations $c$.

When it is desired to cook meats, vegetables, &c., by the action of steam, they may be placed upon the disk B and a cover placed over the vessel.

Our invention may also be employed in connection with wash-boilers and other devices; and we do not wish to confine ourselves to the exact construction or form herein shown and described, but reserve to ourselves the right to change or modify the same within the scope of our invention.

We are aware of the construction set forth and illustrated in the expired patents of F. W. Dembois, No. 53,421, March 27, 1866, and H. Adler, No. 69,890, dated October 15, 1867, and do not claim, broadly, any features set forth or illustrated therein. Our invention will, however, be readily distinguished from such construction in that the disk B is depressed to present a dish for the reception of articles to be steamed.

We claim—

1. The combination, with the vessel A, of a depressed disk, B, provided with perforations $c$, and adapted to receive and hold articles to be steamed, and a central tube, C, attached to the same, substantially as set forth.

2. An attachment for cooking-vessels, consisting of a concave disk, B, with a central opening and circumferential perforations $c$, a tapered tube, C, rigidly attached thereto, and provided at its upper portion with a concave cover, D, supported above the end of the tube, substantially as shown, and for the purpose set forth.

In testimony whereof we affix our signatures in presence of two witnesses.

RUDOLF F. SCHIMPER.
CHARLES F. W. SIEDHOF.

Witnesses:
BERNHARD LIPPART,
FREDERICK FRAMBACH.